(12) United States Patent
Beavin et al.

(10) Patent No.: US 8,666,969 B2
(45) Date of Patent: Mar. 4, 2014

(54) QUERY REWRITE FOR PRE-JOINED TABLES

(75) Inventors: Thomas A. Beavin, Milpitas, CA (US); Mengchu Cai, San Jose, CA (US); Ruiping Li, Cupertino, CA (US); James A. Ruddy, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 13/295,984

(22) Filed: Nov. 14, 2011

(65) Prior Publication Data

US 2013/0124500 A1    May 16, 2013

(51) Int. Cl.
*G06F 7/00*        (2006.01)

(52) U.S. Cl.
USPC ............ 707/717; 707/694; 707/718; 707/736

(58) Field of Classification Search
None
See application file for complete search history.

(56) References Cited

U.S. PATENT DOCUMENTS

| | | | |
|---|---|---|---|
| 6,496,819 B1 | 12/2002 | Bello et al. | |
| 7,406,468 B2 | 7/2008 | Larson et al. | |
| 7,467,128 B2 | 12/2008 | Larson et al. | |
| 8,359,325 B1 * | 1/2013 | Gui et al. | 707/760 |

OTHER PUBLICATIONS

Let's Look at Materialized Query Tables for DB2 UDB V8 z/OS, IDUG 2005 North America, May 26, 2005 (29 pages) ftp://public.dhe.ibm.com/software/data/db2zos/INAEbersoleF12.pdf.
Introduction to DB2 for zOS, IBM, DB2 Verison 9.1 for z/OS, last accessed May 28, 2011 (423 pages) https://www-304.ibm.com/support/docview.wss?uid=pub1sc18984708.
DB2 Basics_An introduction to materialized query tables, Sep. 2005 (8 pages) http://www.ibm.com/developerworks/data/library/techarticle/dm-0509melnyk/index.htm.

* cited by examiner

*Primary Examiner* — Hosain Alam
*Assistant Examiner* — Bruce Witzenburg
(74) *Attorney, Agent, or Firm* — Shumaker & Sieffert, P.A.

(57) ABSTRACT

Various aspects of this disclosure are directed to receiving, by a computing device, a first table join query that may include a first group of table identifiers that identify the two or more tables. The computing device may determine whether the first table join query includes an outer join command. When the first table join query includes the outer join command, the computing device may compare the first group of table identifiers and a second group of table identifiers of one or more pre-joined tables to determine whether each of the first table identifiers matches at least one of the second group of table identifiers. The computing device may further determine whether a predicate associated with each table identifier matches a predicate associated with a matching second table identifier. When each of the predicates match, the computing device may rewrite the first table join query.

17 Claims, 8 Drawing Sheets

```
PREJOIN (A):
CREATE TABLE A AS(
SELECT TF.C1 AS PREJC1, TF.C2 AS PREJC2, TF.C3 AS PREJC3, TF.C4 AS PREJC4,
       D1.C1 AS PREJC5, D1.C2 AS PREJC6,
       D2.C1 AS PREJC7, D2.C2 AS PREJC8,
       A.C1 AS PREJC9, A.C2 AS PREJC10, A.C3 AS PREJC11, A.C4 AS PREJC12,
       B.C1 AS PREJC13, B.C2 AS PREJC14, B.C3 AS PREJC15, B.C4 AS PREJC16
FROM TF LEFT JOIN D1 ON TF.C1 = D1.C1
LEFT JOIN D2 ON TF.C2 = D2.C1
LEFT JOIN D3 A ON D2.C2 = A.C1
LEFT JOIN D3 B ON TF.C3 = B.C2 AND D1.C2 = B.C3
LEFT JOIN D4 ON TF.C4 = D4.C1
```

```
QUERY (Q1):
SELECT TF.C1, D1.C1, SUM(D2.C2), SUM(A.C1)
FROM TF INNER JOIN D2 ON TF.C2 = D2.C1
       LEFT JOIN D1 ON TF.C1 = D1.C1
       LEFT JOIN D3 B ON TF.C3 = B.C2 AND D1.C2 = B.C3
       LEFT JOIN D3 A ON D2.C2 = A.C1
WHERE D2.C2 = 5 AND D2.C2 = A.C2 AND
      (TF.C3 = B.C4 OR B.4 = 8) AND
      D2.C2 = 1
GROUP BY TF.C2, D1.C1
```

FIG. 2A

| QUERY TABLE | INDEX |
|---|---|
| TF | 1 |
| D2 | 2 |
| D1 | 3 |
| B | 4 |
| A | 5 |

44, 45A, 45B

| PRE-JOIN TABLE | INDEX |
|---|---|
| TF | 1 |
| D1 | 2 |
| D2 | 3 |
| A | 4 |
| B | 5 |
| D4 | 6 |

46, 47A, 47B

| QUERY TABLE INDEX | PRE-JOIN TABLE INDEX | MAPPING |
|---|---|---|
| 1 | 1 | COMMON |
| 2 | 3 | COMMON |
| 3 | 2 | COMMON |
| 4 | 5 | COMMON |
| 5 | 4 | COMMON |
|   | 6 | EXTRA |

| PRE-JOIN PREDICATE INDEX | PREDICATE |
|---|---|
| 1 | TF.C1=D1.C1 |
| 2 | TF.C2=D2.C1 |
| 3 | D2.C2=A.C1 |
| 4 | TF.C3=B.C2 AND D1.C2=B.C3 |
| 5 | TF.C2=D2.C1 AND D2.C2=1 |

| QUERY PREDICATE INDEX | PREDICATE |
|---|---|
| 1 | TF.C2=D2.C1 |
| 2 | TF.C1=D1.C1 |
| 3 | TF.C3=B.C2 AND D1.C2=B.C3 |
| 4 | D2.C2=A.C1 |

| PRE-JOIN PREDICATE INDEX | QUERY PREDICATE INDEX | MAPPING | IS NOT NULL |
|---|---|---|---|
| 1 | 2 | COMMON | |
| 2 | 1 | INNER_OUTER | D2.C1 |
| 3 | 4 | COMMON | |
| 4 | 3 | COMMON | |
| 5 | | LOSSLESS | |

FIG. 2C

QUERY REWRITE FOR PRE-JOINED TABLES

BACKGROUND

This disclosure relates to database queries. Electronic database systems may be used to collect, store, organize, and retrieve large amounts of information. Such database systems may provide an efficient and organized mechanism for multiple users to interact with information. As one example, enterprise software systems, such as inventory management systems, budget planning systems, and order management systems may support many, e.g., hundreds or thousands, of concurrent users. Such large-scale systems may store large amounts of information in one or more databases, such as multidimensional databases, relational databases, hierarchical databases, object-oriented databases, and the like.

In certain examples, as in a relational database, information is organized using tables, including rows and columns, which specify data or relations among tables. Information is retrieved from the database using queries issued to a database management system. For example, structured query language (SQL) queries may be used to retrieve data from one or more tables of a database. In some examples, a query may include a command to select information from two or more tables of a database (e.g., a join command). Similarly, some queries include commands to summarize or otherwise aggregate data from multiple tables.

Such queries may require the database management system to operate over large amounts of data. For instance, in a data warehouse environment, a database management system may operate over terabytes of data, performing multiple joins or other aggregation operations, thereby resulting in long response times. To improve efficiency and reduce response times, some database systems utilize pre-joined tables that include information derived from two or more tables.

BRIEF SUMMARY

In one example, a method may include receiving, by a computing device, a first table join query to select information from two or more tables of a database. The first table join query may include a first group of table identifiers that identify the two or more tables. The method may further include determining, by the computing device, whether the first table join query includes an outer join command, and when the first table join query includes the outer join command, comparing, by the computing device, the first group of table identifiers and a second group of table identifiers that identify one or more pre-joined tables to determine whether each of the table identifiers of the first group matches at least one of the table identifiers of the second group. The method may further include determining, by the computing device and for each table identifier of the first group, whether a predicate associated with the respective table identifier matches a predicate associated with a second table identifier of the second group, wherein the second table identifier matches the respective table identifier, when each of the table identifiers of the first group matches at least one of the table identifiers of the second group. The method may further include generating, by the computing device, a second table join query based at least in part on the first table join query, wherein the second table join query specifies at least one of the one or more pre-joined tables, when each of the predicates match.

In one example, a computer program product may include a computer-readable storage medium having computer-readable program code embodied therein, the computer-readable program code including computer-readable program code to receive a first table join query to select information from two or more tables of a database, wherein the first table join query comprises a first group of table identifiers that identify the two or more tables. The computer-readable program code may further determine whether the first table join query includes an outer join command. The computer-readable program code may further compare the first group of table identifiers and a second group of table identifiers of one or more pre-joined tables to determine whether each of the first table identifiers of the first group matches at least one of the table identifiers of the second group, when the first table join query includes the outer join command. The computer-readable program code may further determine for each table identifier of the first group whether a predicate associated with the respective table identifier matches a predicate associated with a second table identifier of the second group when each of the table identifiers of the first group matches at least one of the table identifiers of the second table group, wherein the second table identifier matches the respective table identifier. The computer-readable program code may further generate a second table join query based at least in part on the first table join query, wherein the second table join query specifies at least one of the one or more pre-joined tables, when each of the predicates match.

In one example, a computing device includes one or more processors and a query processing module, executable by the one or more processors to, receive a first table join query to select information from two or more tables of a database. The first table join query may include a first group of table identifiers that identify the two or more tables. The query processing module may be further executable by the one or more processors to determine whether the first table join query includes an outer join command, and when the first table join query includes the outer join command: compare the first group of table identifiers and a second group of table identifiers of one or more pre-joined tables to determine whether each of the first table identifiers of the first group matches at least one of the table identifiers of the second group; determine for each table identifier of the first group whether a predicate associated with the respective table identifier matches a predicate associated with a second table identifier of the second group when each of the first table identifiers of the first group matches at least one of the second table identifiers of the second group, wherein the second table identifier matches the respective table identifier; and generate a second table join query based at least in part on the first table join query, wherein the second table join query specifies at least one of the one or more pre-joined tables, when each of the predicates match.

The details of one or more aspects of this disclosure are set forth in the accompanying drawings and the description below. Other features, objects, and advantages of the disclosure will be apparent from the description and drawings, and from the claims.

BRIEF DESCRIPTION OF THE SEVERAL VIEWS OF THE DRAWINGS

FIG. 2, consisting of FIGS. 2A-2C, is a block diagram illustrating further examples of the table mapping and predicate mapping structures of FIG. 1, in accordance with one or more aspects of this disclosure.

DETAILED DESCRIPTION

Figure 1:
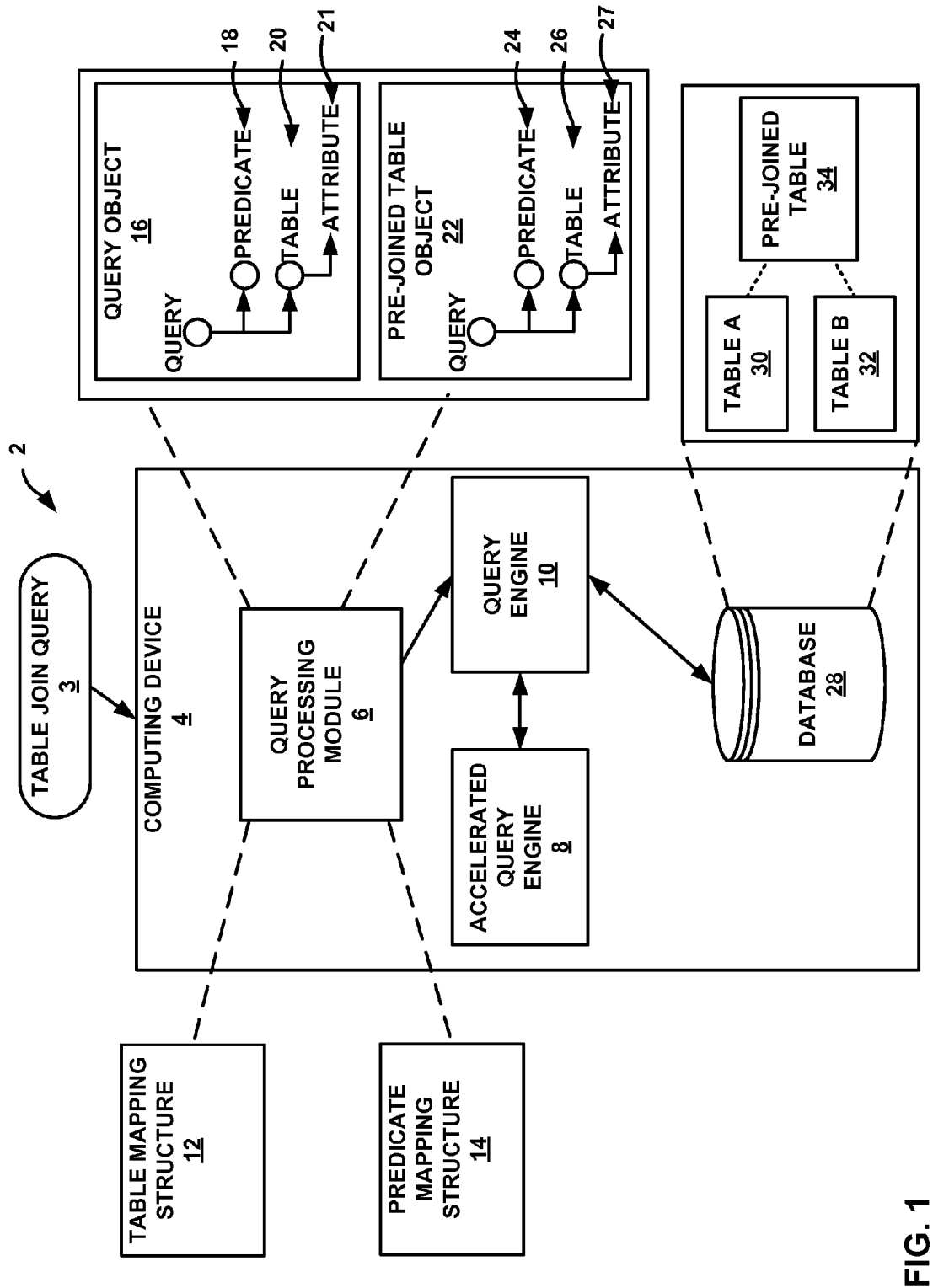
FIG. 1 is a block diagram illustrating an example computing system that may be used for rewriting a table join query to utilize a pre-joined table of a database, in accordance with one or more aspects of this disclosure.

Table join queries may be used to select information from two or more tables of a database. However, such queries may operate over large amounts of data. For instance, a table join query may select information from multiple tables, each containing large amounts of data, thereby resulting in long response times to service the query. To help reduce the response time to service table join queries, some database systems utilize pre-joined tables. For example, some database systems maintain a group of pre-joined tables based on common table join queries submitted to the database. When a requested query includes a table join query, the database system first determines whether a pre-joined table exists that matches the table requested by the table join command. When the database system includes such a pre-joined table, rather than resubmit the table join query to the database against the underlying base table, the database system may use the pre-joined table to service the request. Because pre-joined tables typically include less data than their underlying base tables, using a pre-joined table may help to reduce the response time to service the request.

As one example, a table join query may include an inner join command to select information from two or more tables of a database (e.g., table A and table B). The inner join command may be used to combine column values of tables based upon a predicate. In response to receiving the inner join command, a database system compares each row of table A with each row of table B to select matching rows in each table that satisfy the join predicate. When the join predicate is satisfied, column values for each matched set of rows are included as a row of the resulting table. However, the semantics of an inner join command may result in the loss of one or more rows of either or both of the tables being joined (i.e., a lossy-join). For instance, an inner join of table A and table B produces a result that includes column values matching rows of table A and table B. However, one or more of table A or table B may include rows that do not match a row in the other table (e.g., table A may include a row that does not match a row from table B). In such case, a resultant table produced from the inner join command may not include column values from the non-matching row.

In response to receiving an inner join command (e.g., an inner join of table A and table B), a database system may determine whether a pre-joined table exists that matches the resulting table requested by the inner join command (e.g., a pre-joined table including the results of an inner join of table A and table B). However, because of the semantics of the inner join command, the database system may impose referential integrity constraints on the tables to ensure that the joins are loss-less. In some examples, such referential integrity constraints may not be defined, possibly preventing the use of a pre-joined table to service the query.

As another example, a table join query may include an outer join command to select information from two or more tables of a database. The semantics of an outer join command differ from that of an inner join command, in that the result of an outer join retains rows of one or more of the joined tables even if no matching rows are identified. For example, a left outer join of a table A and a table B returns all rows from table A (i.e., the left table) even if no matching row is identified in table B (i.e., the right table). As such, a resulting table from a left outer join of tables A and B includes all values from table A, in addition to values from table B that satisfy the join predicate of the query. Therefore, with respect to the left table, a left outer join may be considered loss-less (e.g., no records of the left table are omitted from the table resulting from the left outer join). However, with respect to the right table, a left outer join may not be loss-less. That is, those records of the right table that do not match the join predicate are omitted from the table resulting from the left outer join. Therefore, a left outer join of tables A and B (i.e., where table A is the left table and table B is the right table) may not produce the same result as a left outer join of tables B and A (i.e., where table B is the left table and table A is the right table).

As such, a table join query that includes an outer join command adds a dependency on the join sequence of the tables. The dependency on the join sequence introduces complexities with respect to determining whether a pre-joined table exists that matches the resulting table requested. For instance, a query that includes a left outer join of tables A and B may not be serviceable by a pre-joined table that was joined using a left outer join of tables B and A. Moreover, a table join query may include multiple join predicates, each of which adding a further dependency on the join sequence of the tables. As such, some conventional database systems do not use pre-joined tables to service queries that include an outer join command.

As another example, a query may include a table join command that includes duplicate tables. Similarly, a database system may include a pre-joined table resulting from a table join command that includes duplicate tables. The duplicate tables introduce complexities with respect to determining whether a pre-joined table exists that matches the resulting table requested. For example, when a table join command includes duplicate tables, a matching pre-joined table may not be identified using only an identifier of the table (e.g., a table name). Rather, to determine whether a matching pre-joined table exists, it may also be necessary to determine whether the join predicates of the table join commands used to generate the pre joined table and the join predicates of the requested table join command match. As such, some conventional database systems do not use pre-joined tables to service queries that include duplicate tables, or require that the instances of such duplicate tables occur in the same sequence within the query and the pre-joined table.

Techniques are described herein that allow queries that include outer join commands to be serviced using pre-joined tables. Further, techniques are described herein that allow outer join commands to be used to generate such pre-joined tables, and may reduce or eliminate the need for referential integrity constraints. Moreover, various techniques of this disclosure enable both a pre-joined table and a table join query to include multiple instances of the same table, and allow those instances to occur in any order.

For example, various aspects of this disclosure enable a computing device to service a query that includes one or more outer join commands using pre-joined tables. For instance, the computing device associates an outer join ON predicate of the query with a null padding table of the outer join. The computing device matches table identifiers of the query and the pre-joined table, and pairs common tables. The computing device further matches ON predicates of common tables. In certain examples, the computing device determines that a pre-joined table is usable to service the query (e.g., including the outer join command) when the table identifiers and associated predicates of the query and pre joined tables match. When the computing device determines that the pre joined table is usable to service the query, the computing device "rewrites" the received query to utilize the pre joined table. For instance, the computing device may generate a second query based at least in part on the received query. The second query may specify one or more pre joined tables that the computing device has determined to be usable to service the received query.

In some examples, when the received query includes an inner join command, the computing device matches an ON predicate of the pre-joined table with a WHERE predicate of the query. The computing device appends an IS NOT NULL predicate to the WHERE predicate when rewriting the query to utilize the one or more pre-joined tables.

In certain examples, one or more of the received query or the pre-joined table may include duplicate table identifiers (e.g., a table identifier that is referenced more than once in the query, that is referenced more than once in a pre-joined table, or both). In such examples, the computing device determines that a pre-joined table is usable to service the query by grouping duplicate table identifiers, swapping table identifiers within the groups, mapping table identifiers within the groups, and performing predicate matching on different combinations of the table identifiers and associated predicates within the groups.

An accelerated query engine may be used to execute rewritten queries that utilize one or more pre-joined tables. The accelerated query engine submits queries to utilize the one or more pre-joined tables. The accelerated query engine may support functions that operate upon information included in the one or more pre-joined tables (e.g., a SUM function). In some examples, a received query may include one or more functions that are not supported by the accelerated query engine. Similarly, a received query may include one or more table identifiers that are not included in a pre joined table of the database. However, in either example (e.g., when a query includes a function that is not supported by the accelerated query engine, or when a query includes a table identifier that is not included in a pre-joined table of the database), the query may also include one or more functions that are supported by the accelerated query engine and one or more table identifiers that are included in a pre-joined table of the database.

In some examples, the computing device rewrites the received query such that those portions of the received query that are serviceable by one or more pre-joined tables utilize the accelerated query engine. For instance, the computing device may generate a table expression and include those functions that are supported by the accelerated query engine and those table identifiers that are included in one or more pre-joined tables inside the table expression. The non-supported functions and table identifiers that are not serviceable by a pre-joined table are left outside the table expression. As such, the computing device determines those portions of a received query that are serviceable by a pre joined table, and generates a query such that those portions of that are serviceable by the pre-joined table are executed by the accelerated query engine, and those portions of the received query that are not serviceable by the pre-joined table are executed by a query engine as against one or more base tables.

FIG. 1 is a block diagram illustrating an example computing system 2 that may be used for rewriting a table join query to utilize a pre-joined table 34 of a database 28, in accordance with one or more aspects of this disclosure. Computing device 4, in some examples, may include or be a part of a portable computing device (e.g., a mobile phone, netbook, laptop, personal digital assistant (PDA), tablet device, and the like), desktop computer, or server. As shown in FIG. 1, computing device 4 includes query processing module 6, accelerated query engine 8, query engine 10, and database 28.

Computing device 4 accesses database 28. In some examples, as illustrated in FIG. 1, database 28 may be part of computing device 4, such as a database stored in one or more storage devices of computing device 4. In certain examples, database 28 may be part of one or more devices that are separate from computing device 4, such as one or more servers that computing device 4 may access using a wired or wireless network or both. For example, computing device 4 may use a communications unit of computing device 4 to access database 28 using a local-area network (LAN), a wide-area network such as the Internet, an enterprise network, a telephone network such as a cellular telephone network, or one or more other types of networks.

Examples of database 28 may include, but are not limited to, relational databases, multi-dimensional databases, hierarchical databases, object-oriented databases, or one or more other types of databases. As one example, database 28 may be a relational database. The relational database may organize data using one or more tables, including rows and columns that specify data and relations among tables. In certain examples, one or more of accelerated query engine 8 and query engine 10 may be part of database 28. For example, database 28 may be part of a database management system operable to include accelerated query engine 8 and query engine 10. As such, one or more of accelerated query engine 8, query engine 10, and database 28 may be part of computing device 4, or may be part of one or more devices that are separate from computing device 4, such as one or more servers (e.g., one or more database management servers).

As illustrated in FIG. 1, database 28 may include Table A 30 and Table B 32. As an example, Table A 30 may be a table entitled "Employees." The Employees table may include rows corresponding to the names of employees. The Employees table may further include one or more columns. For instance, the Employees table may include columns corresponding to employee title (e.g., job title), employee salary, years of employment, and the like. The intersection of rows and columns specifies a unique instance of data for the categories defined by the rows and columns (e.g., an employee salary associated with a particular employee name). Similarly, Table B 32 may be a table entitled "Clients." The Clients table may include rows corresponding to a client name (e.g., "IBM"), a client identification number, and the like.

Database 28 may include one or more pre joined tables. Such pre-joined tables may represent relations among two or more tables of database 28. As in the example of FIG. 1, database 28 includes pre-joined table 34 that represents relations between Table A 30 and Table B 32. However, it should be understood that pre-joined table 34 may, in some examples, be joined using multiple tables. For instance, database 28 may further include tables C, D, E, F, etc. Pre-joined table 34 may be the result of one or more table join queries using any number of tables of database 28. Pre-joined table 34 may be joined using a table join query submitted to database 28 to select information from Table A 30 and Table B 32. For example, pre-joined table 34 may be joined using one or more inner join commands, one or more outer join commands, or both, to select information from Table A 30 and Table B 32. In certain examples, pre joined table 34 may be part of accelerated query engine 8. For instance, database 28 may be organized or modeled using one or more tables. The tables of database 28 may be considered base tables. Accelerated query engine 8 may include one or more pre-joined tables that are pre joined using one or more base tables of database 28. As such, pre-joined table 34 may, in some examples, be considered part of accelerated query engine 8.

Computing device 4 receives table join query 3 to select information from Table A 30 and Table B 32. Table join query 3 may include one or more inner join commands, one or more outer join commands, or both. For instance, table join query 3 may be an SQL query that includes an outer join command to select information from Table A 30 and Table B 32 based on a join predicate. Query processing module 6 parses table join query 3, and generates query object 16 to store information about table join query 3.

Query object 16 includes data and/or functions to manipulate the data in query object 16. Examples of such data include strings, integers, pointers, and the like. For instance, the data may include predicate member 18, table member 20, and attribute 21. Table member 20 stores or references information about tables referenced in table join query 3. For example, table member 20 may store one or more table identifiers of tables referenced in table join query 3. As an example, table join query 3 may reference Table A 30 and Table B 32. Table member 20 stores one or more table identifiers of Table A 30 and Table B 32, such as the identifiers "Table A," and "Table B." Predicate member 18 stores or references information about join predicates referenced in table join query 3. Predicate member 18 may store an actual predicate value, for example, a string, such as D1 ON TF.C1=D1.C1.

In some examples, predicate member 18 stores data about the join command with which a predicate is associated. For instance, query processing module 6 may determine that a join predicate is associated with an inner join command. In response, query processing module 6 stores data in an attribute associated with predicate member 18 that indicates that the predicate is associated with an inner join command (e.g., setting a predicate inner join flag). Later, when query processing module 6 determines whether a pre-joined table is capable of servicing a table join query, query processing module determines if the table is associated with an inner join command. For instance, either a predicate inner join flag (e.g., a PRED_IJ flag) may be set, or the table may not have an associated predicate, which may indicate that the table is associated with an inner join. In such examples, query processing module 6 locates an exactly matched predicate from WHERE and ON inner join predicates. Query processing module 6 further stores a not nullable column of the table inside a predicate mapping structure further described herein. The not nullable column is used later during query rewrite for generating a "col IS NOT NULL" predicate on top of the existing WHERE predicate.

In some examples, table member 20 further includes attribute 21. In some examples, attribute 21 stores a reference that associates an ON predicate of a left outer join command of table join query 3 with a right hand side table identifier specified by the left outer join command. Accordingly, in some examples, attribute 21 is a pointer (e.g., named ON_PTR) that stores a memory address of a predicate member, such as predicate 18. In one example, query processing module 6 may generate query object 16 based on the following partial query: "SELECT FROM FACT LEFT JOIN D1 ON FACT.C1=D1.C1." Query processing module 6 generates table member 20 which corresponds to table FACT. Query processing module 6 further stores a value of 0 in attribute 21 that corresponds to table member 20 to indicate table FACT is the left-most table of the query and has no corresponding predicate. Query processing module 6 generates a second table member in query object 16, which corresponds to table D1. Query processing module 6 generates a corresponding predicate member in query object 16 that stores the predicate value "ON FACT.C1=D1.C1." An attribute associated with the second table member stores a memory address of the second table member to indicate that the predicate value "ON FACT.C1=D1.C1" is associated with table D1.

Query processing module 6 determines whether table join query 3 is serviceable using a pre joined table. For example, as in the example of FIG. 1, query processing module 6 determines whether table join query 3 is serviceable using pre-joined table 34. Query processing module 6 selects a pre joined table, such as pre-joined table 34, and creates a pre-joined table object, such as pre-joined table object 22. Pre-joined table object 22 includes data and/or functions to manipulate the data in pre-joined table object 22. Examples, of such data include strings, integers, pointers, and the like.

As illustrated in FIG. 1, pre-joined table object 22 includes predicate member 24, table member 26, and attribute 27. As similarly described with respect to table member 20, table member 26 stores or references information about tables referenced in a table join query that is used to join pre-joined table 34. For example, table member 26 may store one or more table identifiers of tables referenced in the query used to join pre-joined table 34. As in the example of FIG. 1, table member 26 may include the table identifiers "Table A" and "Table B," identifying the tables used to join pre-joined table 34. As similarly described with respect to predicate member 18, predicate member 24 stores or references information about join predicates referenced in the query that is used to generate pre-joined table 34. Predicate member 24 may store an actual predicate value, for example, a string, such as D1 ON TF.C1=D1.C1. In some examples, predicate member 24 stores data about the join command with which a predicate is associated. For instance, query processing module 6 may determine that a join predicate is associated with an inner join command. In response, query processing module 6 stores data in an attribute associated with predicate member 24 that indicates that the predicate is associated with an inner join command (e.g., setting a predicate inner join flag).

In some examples, table member 26 further includes attribute 27. In some examples, attribute 27 stores a reference that associates an ON predicate of a left outer join command of a table join query that is used to join pre-joined table 34 with a right hand side table identifier specified by the left outer join command. Accordingly, in some examples, attribute 27 is a pointer (e.g., named ON_PTR) that stores a memory address of a predicate member, such as predicate 24. In one example, query processing module 6 generates pre-joined query object 22 based on the following partial query: "SELECT FROM FACT LEFT JOIN D1 ON FACT.C1=D1.C1." Query processing module 6 generates table member 26 which corresponds to table FACT. Query processing module 6 further stores a value of 0 in attribute 27 that corresponds to table member 26 because table FACT is the left-most table of the query and has no corresponding predicate. Query processing module 6 generates a second table member in pre-joined query object 22, which corresponds to table D1. Query processing module 6 generates a corresponding predicate member in pre-joined query object 22 that stores the predicate value "ON FACT.C1=D1.C1." An attribute associated with the second table member stores a memory address of the second table member to indicate that the predicate value "ON FACT.C1=D1.C1" is associated with table D1.

In some examples, query processing module 6 generates table mapping structure 12 and predicate mapping structure 14. Query processing module 6 may use table mapping structure 12 and predicate mapping structure 14 to determine whether pre-joined table 34 is usable to service table join query 3. Query processing module 6 uses information included in query object 16 and pre-joined table object 22 to generate table mapping structure 12 and predicate mapping structure 14. For example, table mapping structure 12 includes information about tables referenced in table join query 3 and a query used to join pre-joined table 34. Examples of such information include one or more table identifiers referenced in table join query 3 and a query used to join pre joined table 34, and indices indicating the relative sequence of such tables in each query.

Table mapping structure 12 further includes a mapping flag indicating whether the table identifiers included in table join query 3 and a query used to generate pre-joined table 34 are common to both queries, whether a table identifier is included only in table join query 3 (e.g., included in table join query 3 but not in a query used to generate pre-joined table 34), or whether a table identifier is included only in a query used to generate pre-joined table 34 (e.g., included in the query used to generate pre-joined table 34 but not included in table join query 3). Query processing module 6 may use table mapping structure 12 to identify table identifiers that are common to both table join query 3 and a query used to generate pre-joined table 34.

Query processing module 6 may, in some examples, determine that all of the table identifiers of table join query 3 are common to the group of table identifiers used to generate pre-joined table 34. In other words, query processing module 6 uses table mapping structure 12 to determine that all of the table identifiers in the group of table identifiers included in table join query 3 are common to the group of table identifiers included in the query used to generate pre joined table 34. Query processing module 6 selects a pair of table identifiers associated with a pair of common tables. In response to selecting the pair of table identifiers, query processing module 6 selects attributes associated with each of the table identifiers from query object 16 and pre-joined table object 22, respectively. Query processing module 6 determines whether each of the attributes match, e.g., is the same value. If the attributes do not match, the pre-joined table may not be used to service the table join query and the next pre-joined table of database 28 is evaluated for use to service the table join query. If, however, each of the attributes is equal to values of 0, the common table may be a left-most table of an outer join query. Because the values match (i.e., are 0), no predicates are associated with the common table. Query processing module 6 therefore selects the next pair of table identifiers indicated by table mapping structure 12.

In response to selecting the next pair of table identifiers, query processing module 6 selects attributes associated with each of the table identifiers from query object 16 and pre-joined table object 22, respectively. Query processing module 6 determines whether each of the attributes match, e.g., is the same value. If the attributes do not match, the pre-joined table may not be used to service the table join query and the next pre-joined table of database 28 are evaluated for use to service the table join query. If, however, each of the attributes match (e.g., are the same value), query processing module 6 determines if the predicates associated with the respective tables also match.

For each pair of common table identifiers, query processing module 6 further uses predicate mapping structure 14 to determine whether pre-joined table 34 is usable to service table join query 3. For instance, query processing module 6 selects table identifiers that identify a pair of common tables. Query processing module 6 compares predicate values (e.g., stored in predicate members of a query object and pre-joined object) that are associated with each table of the pair of common tables to determine whether the predicate associated with the selected table of the table join query matches the predicate associated with the selected table of the pre-joined query.

When table join query 3 includes an outer join command (e.g., a left outer join command), the sequence of table identifiers and associated join predicates may affect the result of the query. As such, query processing module 6 uses predicate mapping structure 14 to determine whether the sequence of table identifiers and associated join predicates in the query used to generate pre joined table 34 matches the sequence of table identifiers and associated join predicates included in table join query 3.

Predicate mapping structure 14 includes information about table identifiers of table join query 3 and a query used to generate pre-joined table 34. Predicate mapping structure 14 further includes information to associate join predicates of each query with the table identifier upon which the predicate operates. For example, predicate mapping structure 14 includes the index of the table identifier upon which each predicate operates. As such, query processing module 6 uses query object 16 and pre-joined table object 22 to determine whether the one or more join predicates included in table join query 3 matches the one or more join predicates included in the query used to generate pre-joined table 34. Query processing module 6 may determine that when the join predicates and sequence of join predicates of each query match, pre-joined table 34 is usable to service table join query 3.

In one example, the predicate value associated with the selected table of the table join query is stored in predicate member 18 of query object 16. Additionally, a pointer (e.g., named ON_PTR) may further be associated with table member 20. The value of the pointer may be a memory address that identifies the predicate member 18. Pre joined table object 22 may similarly include a pointer (e.g., named ON_PTR) associated with table member 26 that points to predicate member 24. Predicate member 24 may store a predicate value associated with the table of the pre joined query. By comparing predicate values associated, respectively, with the selected table of the table join query and the selected table of pre-joined table 34, query processing module 6 determines whether pre-joined table 34 can service table join query 3. For instance, if the predicates associated with the selected table of the table join query and the selected table of pre-joined table 34 match, query processing module 6 proceeds to select a next table in the table mapping structure for comparison to determine whether the pre joined table is usable to service the table join query.

In response, query processing module 6 rewrites table join query 3 to utilize pre-joined table 34. For instance, query processing module 6 rewrites table join query 3 to substitute the table names of the table identifiers included in table join query 3 with the name of the pre joined table 34.

As one example of a rewrite technique, a pre-joined table may be initially generated according to the following pseudo code query:

```
AQT (A):
CREATE TABLE A AS (
  SELECT TF.C1 AS AQTC1, TF.C2 AS AQTC2, TF.C3 AS
    AQTC3, TFC4 AS AQTC4, D1.C1 AS AQTC5, D1.C2 AS
    AQTC6, D2.C1 AS AQTC7, D2.C2 AS AQTC8, A.C1 AS
    AQTC9, A.C2 AS AQTC10, A.C3 AS AQTC11, A.C4 AS
    AQTC12, B.C1 AS AQTC13,B.C2 AS AQTC14,B,C3 AS
    AQTC15,B.C4 AS AQTC16
  FROM TF LEFT JOIN D1 ON TF.C1 = D1.C1
    LEFT JOIN D2 ON TF.C2 = D2.C1
    LEFT JOIN D3 A ON D2.C2 = A.C1
    LEFT JOIN D3 B ON TF.C3 = B.C2 AND D1.C2 = B.C3
    LEFT JOIN D4 ON TF.C4 = D4.C1
```

A first table join command may be specified according to the following pseudo code query:

```
SELECT TF.C1, D1.C1, SUM(D2.C2), SUM(A.C1)
FROM TF INNER JOIN D2 ON TF.C2 = D2.C1
  LEFT JOIN D1 ON TF.C1 = D1.C1
  LEFT JOIN D3 B ON TF.C3 = B.C2 AND D1.C2 = B.C3
  LEFT JOIN D3 A ON D2.C2 = A.C1
WHERE D2.C2 = 5 AND D2.C2 = A.C2 AND
  (TF.C3 = B.C4 OR B.4 = 8) AND
  D2.C2 = 1
GROUP BY TF.C1, D1.C1;
```

In accordance with techniques of the present disclosure (e.g., as described in FIG. 1), the example first table join command is rewritten, according to the following pseudo code query, as a second table join command usable by an accelerated query engine:

```
SELECT AQTC1, AQTC5, SUM(AQTC8), SUM(AQTC9)
FROM A
WHERE AQTC8 = 5 AND AQTC8 = AQTC10 AND
  (AQTC3 = AQTC15 OR AQTC16 = 8) AND
  AQTC8 = 1 AND AQTC7 IS NOT NULL
GROUP BY AQTC1, AQTC5;
```

As illustrated by the previous rewritten query, a rewriting technique performed by query processing module 6 may include generating a second table join query that indicates table names and corresponding predicates of a pre-joined table. The names and predicates of the pre joined table may correspond, e.g., match, the table names and predicates specified in the first table join query. In addition, techniques of this disclosure enable dynamic rewriting of a query to be serviced using one or more pre-joined tables. For example, rather than servicing only the pre joined tables using accelerated query engine 8, an entire query may be processed using accelerated query engine 8. For example, a rewritten query according to techniques of this disclosure may include aggregation functions (e.g., SUM, GROUP BY, and the like) that may be serviced using accelerated query engine 8, even though the pre-joined tables may not have been pre-calculated using an aggregation function included in the query. For instance, as in the example described above, rather than require the pre-joined tables to be pre-calculated using the aggregation functions SUM and GROUP BY, the entire query (e.g., including the SUM and GROUP BY aggregation functions) are serviced using accelerated query engine 8, even though the pre-joined tables may not have been pre-calculated using such aggregation functions.

In some examples, computing device 4 may include accelerated query engine 8 and query engine 10. Computing device 4 uses accelerated query engine 8 and query engine 10 to perform queries on data included in database 28. Accelerated query engine 8 and query engine 10 further process information received from database 28 in accordance with the submitted query. In some examples, one or more of accelerated query engine 8 and query engine 10 may be processes executing on one or more processors of computing device 4. In other examples, one or more of accelerated query engine 8 and query engine 10 may be processes executing on a remote device, such as one or more servers (e.g., a database server).

Query processing module 6 submits rewritten queries to query engine 10. Query engine 10 submits one or more portions of the rewritten query to accelerated query engine 8 to utilize pre-joined tables, such as pre-joined table 34. Accelerated query engine 8 returns a result of the query as executed against pre-joined table 34 to query engine 10 for the remaining query processing (e.g., as against base tables of database 28). In some examples, query processing module 6 submits queries to query engine 10 to utilize base tables, such as when query processing module 6 determines that a received query (e.g., table join query 3) is not serviceable by a pre-joined table. For example, it may be that none of the table identifiers included in table join query 3 match any table identifiers of a pre-joined table. In such case, query processing module 6 determines that no pre joined table is usable to service table join query 3, and submits table join query 3 to query engine 10 to execute the query.

In certain examples, query processing module 6 determines that portions of a received query are serviceable by one or more pre-joined tables, and other portions of the received query are not serviceable by the pre-joined table. For instance, a table join query 3 may include some table identifiers that match table identifiers of pre-joined table 34, and may include other table identifiers that do not match table identifiers of pre-joined table 34. With respect to the matching table identifiers, query processing module 6 may further determine that the join predicates included in table join query 3 match the join predicates of pre-joined table 34, such that the portion of table join query 3 that includes the matching table identifiers is serviceable by pre-joined table 34. In such an example, query processing module 6 generates table expressions to rewrite the portion of table join query 3 that is serviceable by pre-joined table 34, such as to substitute the table names of the identifiers of table join query 3 with table names of the matching identifiers of pre-joined table 34. Query processing module 6 submits the table expression to query engine 10. Query engine 10 submits the portion of the table expression that is serviceable using pre-joined table 34 to accelerated query engine 8, which executes the portion of the table expression that is serviceable by pre-joined table 34. Accelerated query engine 8 returns the results of the query processed by accelerated query engine 8 as input to the remainder of the query that is submitted to query engine 10. As such, query processing module 6 rewrites a portion of table join query 3 to utilize pre-joined table 34.

In one example, of the techniques illustrated in FIG. 1, a pre-joined table may be initially generated according to the following pseudo code query:

```
AQT(A1) :
CREATE TABLE A1 AS (
  SELECT TF.C1, TF.C2, TF.C3, D1.C1, D1.C2, D1.C3
  FROM TF LEFT JOIN D1
    ON TF.C1 = D1.C1) ;
```

A first table join command may be specified according to the following pseudo code query:

```
SELECT TF.C1+3, CHAR(D1.C1), D2.C1+1 (outside), D2.C1 +
    D1.C1 (outside)
FROM TF, D1, D2
WHERE TF.C1 = D1.C1
    TF.C2 = D2.C1 AND
    TF.C3 = D1.C2 AND
    D2.C2 = 6 AND
    TF.C2 > 5;
```

In accordance with techniques of the present disclosure (e.g., as shown in FIG. 1), the example first table join command is rewritten using table expressions (e.g., TX (C1, C2, C3, C4)), according to the following pseudo code query, as a second table join command usable by an accelerated query engine:

```
SELECT TX.C1, TX.C2, D2.C1 + 1, D2.C1 + TX.C3
FROM D2, (SELECT A1.C1 + 3, CHAR(A1.C4), A1.C4, A1.C2
FROM A1
WHERE A1.C3 = A1.C5 AND A1.C2 > 5 AND D1.C1 IS NOT NULL)
    AS TX(C1, C2, C3, C4)
WHERE TX.C4 = D2.C1 AND D2.C2 = 6;
```

FIG. 2, consisting of FIGS. 2A-C, is a block diagram illustrating further detailed examples of the table mapping and predicate mapping structures 12 and 14 of FIG. 1, in accordance with one or more aspects of this disclosure. As illustrated in FIG. 2A, query processing module 6 receives table join query 42 to select information from two or more tables of database 28. Database 28 may include one or more pre-joined tables. In some examples, accelerated query engine 8 may include one or more pre-joined tables. As illustrated in FIG. 2A, pre-join query 40 may be used to generate a pre-joined table of database 28. As illustrated in FIG. 2B, query processing module 6 generates query table index structure 44, pre-join table index structure 46, and table mapping structure 12. As illustrated in FIG. 2C, query processing module 6 generates pre-join predicate index structure 52, query predicate index structure 54, and predicate mapping structure 14. Query processing module 6 uses query table index structure 44 and pre-join table index structure 46 to generate table mapping structure 12. Query processing module 6 uses pre-join predicate index structure 52 and query predicate index structure 54 to generate predicate mapping structure 14. Query processing module 6 uses table mapping structure 12 and predicate mapping structure 14 to determine whether a pre-joined table of database 28 is usable to service table join query 42.

Query table index structure 44 includes information about tables referenced in table join query 42. As illustrated in FIG. 2B, query table index structure 44 includes information such as one or more table identifiers referenced in table join query 42 and one or more query table indices. Similarly, pre-join table index structure 46 includes information such as one or more table identifiers referenced in pre-join query 40 and one or more pre-join table indices. Table mapping structure 12 includes information to map query table indices of query table index structure 44 to pre-join table indices of pre join table index structure 46. Table mapping structure 12 further includes one or more table mapping flags, indicating a relationship between query table identifiers included in pre join query 40 and table identifiers included in table join query 42.

For instance, table mapping structure 12 may include one or more table mapping flags indicating that table identifiers included in pre-join query 40 and table join query 42 are common to both queries (e.g., the table identifiers are included in both queries 40 and 42). Similarly, table mapping structure 12 may include one or more table mapping flags indicating that one or more table identifiers included in table join query 42 are residual table identifiers (e.g., the one or more table identifiers are included in table join query 42 but are not included in pre-join query 40), or one or more table identifiers included in pre-join query 40 are extra table identifiers (e.g., the one or more table identifiers are included in pre-join query 40 but not included in table join query 42).

As one example, query processing module 6 parses table join query 42 and pre join query 40, and generates query object 16 (e.g., relating to table join query 42) and pre-joined table object 22 (e.g., relating to pre-join query 40). Query object 16 includes a group of table identifiers (e.g., stored or referenced using one or more table members 20) corresponding to a group of table identifiers referenced in table join query 42. Similarly, pre-join table object 22 includes a group of table identifiers (e.g., stored or referenced using one or more table members 26) corresponding to a group of table identifiers referenced in pre-join query 40. For instance, as in the example of FIG. 2A, when parsing table join query 42, query processing module 6 may encounter the portion of table join query 42 that states "FROM TF INNER JOIN". In response, query processing module 6 generates table member 20 corresponding to table TF. Table member 20 stores or references a table identifier corresponding to table TF. Query processing module 6 includes query table identifier 45A (e.g., TF) in query table index structure 44.

Query processing module 6 continues parsing table join query 42 and may encounter the portion of table join query 42 that states "D2 ON TF.C5=D2.C1". In response, query processing module 6 generates another table member of query object 16 that corresponds to table D2. Query processing module 6 stores or references a table identifier corresponding to table D2, and includes the query table identifier D2 in query table index structure 44. Query processing module 6 may continue to parse table join query 42 and update query table index structure 44 until query processing module 6 reaches the end of table join query 42.

Query processing module 6 may similarly parse pre join query 40 and update pre join table index structure 46 accordingly. For example, when parsing pre-join query 40, query processing module 6 may encounter the portion of pre-join query 40 that states "FROM TF LEFT JOIN". Query processing module 6 generates table member 26 in pre-joined table object 22, corresponding to table TF. Table member 26 stores or references a table identifier corresponding to table TF. Query processing module 6 includes pre-join table identifier 47A (e.g., TF) in pre join table index structure 46. Similarly, query processing module 6 may continue parsing pre-join query 40, and may encounter the portion of pre-join query 40 that states "D1 ON TF.C1=D1.C1". Query processing module 6 generates another table member of pre-joined table object 22 that corresponds to table D1, and includes the pre join table identifier D1 in pre-join table index structure 46. Query processing module 6 may continue to parse pre-join query 40 and update pre-join table index structure 46 until query processing module 6 reaches the end of pre-join query 40.

Query table index structure 44 and pre-join table index structure 46 each further include a query table index and pre join table index, respectively, for each of the table identifiers in the groups of table identifiers. The indices indicate the relative sequence of the table identifiers in the respective queries. For instance, query processing module 6 may include query table index 45B in query table index structure 44. In the example of FIG. 2B, the value of query table index 45B (e.g., 1) indicates that query table identifier 45A (e.g., TF) is the first table identifier of table join query 42. Similarly, the query table index value 2 associated with query table identifier D2 of query table index structure 44 indicates that query table identifier D2 is the second table identifier of table join query 42.

In a similar manner, query processing module 6 may include pre-join table index 47B in pre-join table index structure 46. The value of pre join table index 47B (e.g., 1) indicates that pre-join table identifier 47A (e.g., TF) is the first table identifier of pre-join query 40. The pre-join table index value 2 associated with pre-join table identifier D1 of pre-join table index structure 46 indicates that pre-join table identifier D1 is the second table identifier of pre-join query 40.

Table mapping structure 12 includes one or more query table indices and one or more pre-join table indices that are used to map the group of query table identifiers to a corresponding table identifier of the group of pre-joined table identifiers. For example, table mapping structure 12 may include query table index 48A (e.g., 1) relating to query table identifier 45A (e.g., TF) of query table index structure 44. Table mapping structure 12 may further include pre-join table index 48B (e.g., 1) relating to pre-join table identifier 47A (e.g., TF) of pre-join table index structure 46. The values of query table index 48A (e.g., 1) and pre-join table index 48B (e.g., 1) indicate that query table identifier 45A (e.g., TF) and pre-join table identifier 47A (e.g., TF) are both the first table identifiers of table join query 42 and pre join query 40 respectively.

Similarly, table mapping structure 12 may include query table index 50A (e.g., 2) and pre-join table index 50B (e.g., 3). The values of query table index 50A (e.g., 2) indicate that the query table identifier D2 of query table index structure 44 is the second table identifier of table join query 42. The value of pre-join table index 50B (e.g., 3) indicates that the query table identifier D2 of pre-join table index structure is the third table identifier of pre-join query 40.

Table mapping structure 12 may further include one or more table mapping flags indicating a relationship between query table identifiers included in pre-join query 40 and table identifiers included in table join query 42. For instance, as illustrated in FIG. 2B, table mapping structure 12 includes table mapping flag 48C with a value of COMMON, indicating that table identifiers associated with query table index 48A and pre join table index 48B (e.g., TF) are common to both pre-join query 40 and table join query 42 (e.g., the table identifiers are included in both pre-join query 40 and table join query 42). Similarly, table mapping flag 48C, with a value of COMMON, indicates that table identifiers associated with query table index 50A and pre-join table index 50B (e.g., D2) are common to both pre join query 40 and table join query 42.

In some examples, a table identifier is included in the group of table identifiers of pre-join query 40, but not in the group of table identifiers of table join query 42. Such table identifiers may be referred to as "extra" tables. In such case, as illustrated in FIG. 2B, query processing module 6 includes a table mapping flag in table mapping structure 12 with the value "EXTRA". In certain examples, a table identifier is included in the group of table identifiers of table join query 42, but not in the group of table identifiers of pre-join query 40. Such table identifiers may be referred to "residual" tables. As such, query processing module 6 includes a table mapping flag in table mapping structure 12 with the value "RESIDUAL".

Query processing module 6 may parse pre-join query 40 and table join query 42 to generate pre-join predicate index structure 52 and query predicate index structure 54. Query processing module 6 uses pre-join predicate index structure 52 and query predicate index structure 54 to generate predicate mapping structure 14. As illustrated in FIG. 2C, pre-join predicate index structure 52 includes information such as one or more one or more pre-join predicates referenced in pre-join query 40 and one or more pre-join predicate indices associated with the one or more pre join predicates. Similarly, query predicate index structure 54 includes information such as one or more query predicates referenced in table join query 42 and one or more query predicate indices associated with the one or more query predicates. Predicate mapping structure 14 includes information to map pre join predicate indices of pre-join predicate index structure 52 to one or more query predicate indices of query predicate index structure 54.

Predicate mapping structure 14 may further include one or more predicate mapping flags. For instance, predicate mapping structure 14 may include one or more predicate mapping flags indicating that predicates included in pre-join query 40 and table join query 42 are common to both queries (e.g., the predicates are included in both queries 40 and 42). In some examples, predicate mapping structure 14 may include one or more predicate mapping flags indicating that one or more predicates included in table join query 42 are associated with an inner join command. In such examples, predicate mapping structure 14 includes an IS NOT NULL column, and includes an indicator of a table identifier upon which the inner join command operates. In certain examples, pre-join query 40 may include one or more extra table identifiers (e.g. table identifiers included in pre join query 40 but not included in table join query 42). Such extra table identifiers may include one or more predicates associated with the extra table identifiers. In such examples, query processing module 6 analyzes the predicates associated with the one or more extra table identifiers to determine whether the predicate results in a loss-less join (e.g., no records of the left table are omitted from the table as a result of the extra join predicate). Query processing module 6 may determine that when pre-join query 40 includes an extra table identifier, a pre-joined table resulting from pre-join query 40 may not be used to service table join query 42 unless the join resulting from an extra predicate associated with the extra table results in a loss-less join. In such an example, predicate mapping structure 14 includes a predicate mapping flag with a value of LOSSLESS, indicating that the join resulting from the predicate associated with the extra table results in a loss-less join.

As one example, query processing module 6 may parse table join query 42 and pre-join query 40. When parsing pre join query 40, query processing module 6 may encounter the portion of pre join query 40 that states "ON TF.C1=D1.C1". Query processing module 6 generates predicate member 24 of pre-joined table object 22. Predicate member 24 may store an actual predicate value, for example, a string, such as the predicate TF.C1=D1.C1. Query processing module 6 may include pre-join predicate 53B with a value of TF.C1=D1.C1 in pre-join predicate index structure 52. In addition, pre-join predicate index structure 52 may include pre join predicate index 53A. The value of pre-join predicate index 53A (e.g., 1) indicates that pre-join predicate 53B is the first predicate of pre-join query 40. Query processing module 6 may continue to parse pre-join query 40 and update pre join predicate index structure 52 accordingly until query processing module 6 reaches the end of pre-join query 40.

In a similar manner, query processing module 6 may parse table join query 42, and update query predicate index structure 54 accordingly. For instance, query processing module 6 may encounter the portion of table join query 42 that states "ON TF.C2=D2.C1". Query processing module 6 may include query predicate 55B, with a value of TF.C2=D2.C1, in query predicate index structure 54. Query processing module 6 may further include query predicate index 55A in query predicate index structure 54. The value of query predicate index 55A (e.g., 1) indicates that query predicate 55B is the first predicate of table join query 42.

Query processing module 6 uses pre-join predicate index structure 52 and query predicate index structure 54 to generate predicate mapping structure 14. Predicate mapping structure 14 includes information that may be used to map one or more pre-join predicate indices associated with one or more pre-join predicates to one or more query predicate indices associated with one or more query predicates. For example, as illustrated in FIG. 2C, predicate mapping structure 14 includes pre-join predicate index 56A (e.g., 1), indicating that the associated pre join predicate 53B (e.g., TF.C1=D1.C1) is the first predicate of pre-join query 40. Predicate mapping structure 14 may further include query predicate index 56B (e.g., 2), indicating that the query predicate with a value of TF.C1=D1.C1 is the second predicate of table join query 42. Predicate mapping structure 14 may include predicate mapping flag 56C, with a value of COMMON, indicating that the predicates associated with pre-join predicate index 56A and query predicate index 56B are common to both pre join query 40 and table join query 42.

In a similar manner, query processing module 6 may include pre-join predicate index 58A in predicate mapping structure 14. The value of pre-join predicate index 58A (e.g., 2) indicates that the predicate associated with pre-join predicate index 58A (e.g., TF.C2=D2.C1) is the second predicate of pre join query 40. Predicate mapping structure 14 may further include query predicate index 58B. The value of query predicate index 58B (e.g., 1) indicates that the predicate associated with pre-join predicate index 58B (e.g., pre-join predicate 55B with a value of TF.C2=D2.C1) is the first predicate included in pre-join query 40.

Predicate mapping structure 14 may include predicate mapping flag 58C. The value of predicate mapping flag 58C (e.g., the value of INNER OUTER) indicates that the predicate associated with query predicate index 58B (e.g., query predicate 55B with a value of TF.C1=D2.C1) is associated with an inner join command of table join query 42. Query processing module determines that the predicate associated with query predicate index 58B is associated with an inner join command, such as by determining that a predicate member 18 of query object 16 associated with the predicate includes a predicate inner join flag that is set.

Query processing module 6 may use such a predicate mapping flag (e.g., a predicate mapping flag indicating that a predicate index of a query table identifier is associated with an inner join command) to enable query processing module 6 to rewrite the table join query to utilize the pre-joined table. For example, when a join predicate of a query table identifier is associated with an inner join, query processing module 6 identifies a matching predicate, and treats the predicate as a WHERE predicate. For example, query processing module 6 may include an IS NOT NULL column in predicate mapping structure 14, and may include not null table identifier 58D. In one example, query processing module 6 rewrites the table join query to append an "<column name> IS NOT NULL" predicate to the WHERE predicate. For instance, as in the example of FIG. 2C, query processing module 6 rewrites the table join query to append an "D2.C1 IS NOT NULL" predicate to the WHERE predicate.

Figure 3:
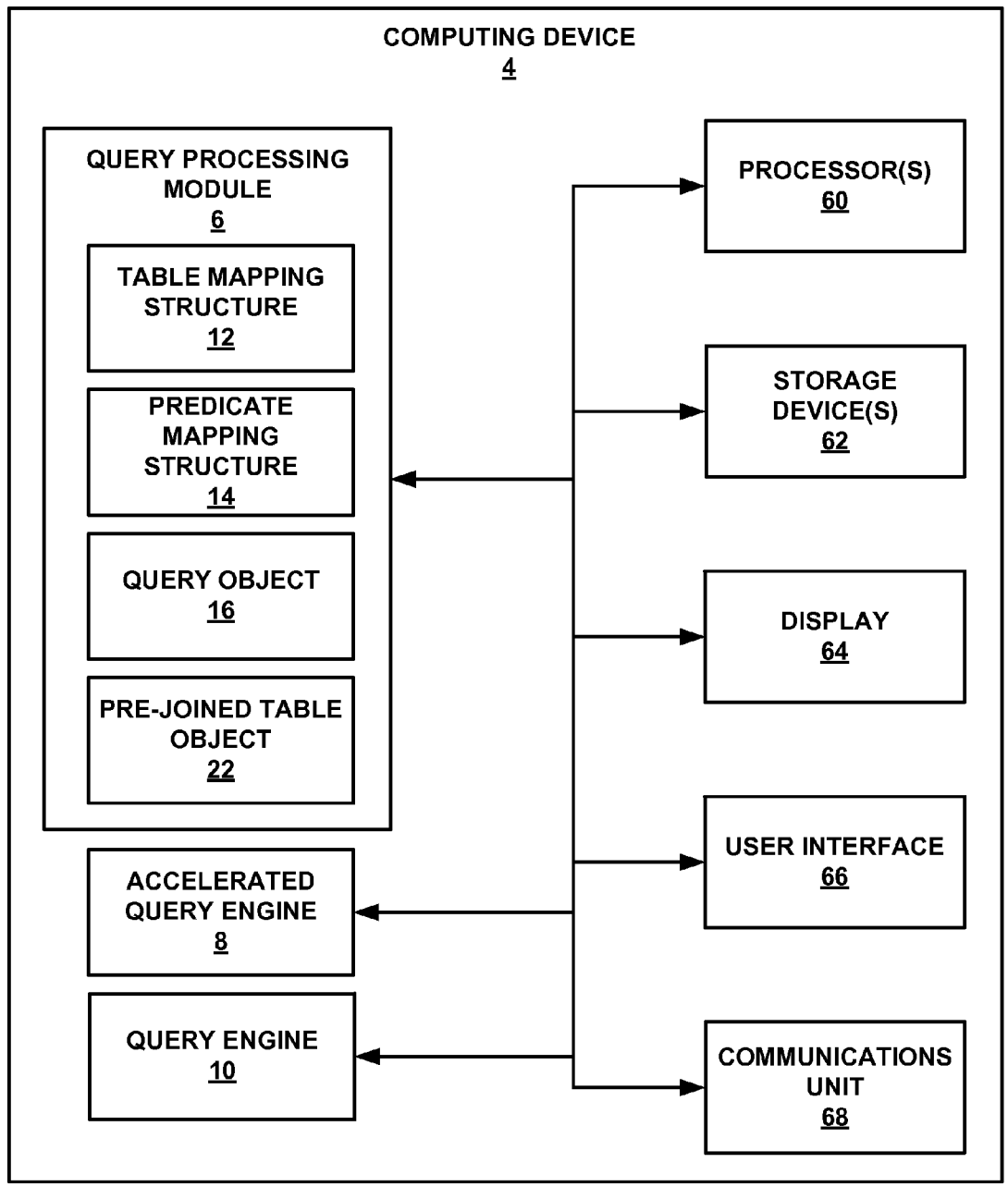
FIG. 3 is a block diagram illustrating an example computing device that may be used for rewriting a table join query to utilize a pre-joined table of a database, in accordance with one or more aspects of this disclosure.

FIG. 3 is a block diagram illustrating an example computing device 4 that may be used for rewriting a table join query to utilize a pre-joined table of a database, in accordance with one or more aspects of this disclosure. As illustrated in FIG. 3, computing device 4 includes query processing module 6, accelerated query engine 8, query engine 10, one or more processors 60, one or more storage devices 62, display 64, user interface 66, and communications unit 68. Query processing module 6 includes table mapping structure 12, predicate mapping structure 14, query object 16, and pre-joined table object 22.

Computing device 4 may include additional components not shown in FIG. 3 for clarity. For example, if computing device 4 comprises a mobile computing device (e.g., a laptop computer), computing device 4 may include a battery to provide power to the components of computing device 4. Similarly, the components of computing device 4 shown in FIG. 3 may not be necessary in every example of computing device 4. For instance, if computing device 4 comprises a server, computing device 4 may not include display 64 or user interface 66.

Although shown as separate components in FIG. 3, in some examples, one or more of query processing module 6, table mapping structure 12, predicate mapping structure 14, query object 16, pre-joined table object 22, accelerated query engine 8, and query engine 10 may be part of the same module. In some examples, one or more of query processing module 6, table mapping structure 12, predicate mapping structure 14, query object 16, pre-joined table object 22, accelerated query engine 8, query engine 10 and one or more processors 60 may be formed in a common hardware unit. In certain examples, one or more of query processing module 6, table mapping structure 12, predicate mapping structure 14, query object 16, pre-joined table object 22, accelerated query engine 8, and query engine 10 may be software and/or firmware units that are executed on or operable by one or more processors 60 to perform various techniques of this disclosure.

One or more processors 60 may include, in certain examples, any one or more of a microprocessor, a controller, a digital signal processor (DSP), an application specific integrated circuit (ASIC), a field-programmable gate array (FPGA), or equivalent discrete or integrated logic circuitry. In some examples, one or more storage devices 62 may store one or more instructions that cause one or more processors 60 and modules 6, 8, 10, 12, 14, 16, and 22 to perform various functions ascribed to one or more processors 60, and modules 6, 8, 10, 12, 14, 16, and 22.

One or more storage devices 62 may include any form of machine- or computer-readable media. For example, one or more storage devices 62 may include any volatile, non-volatile, magnetic, optical, or electrical media, such as a hard drive, random access memory (RAM), read-only memory (ROM), non-volatile RAM (NVRAM), electrically-erasable programmable ROM (EEPROM), flash memory, or any other digital media.

Display 64 may be a liquid crystal display (LCD), e-ink, organic light emitting diode (OLED), or other display. Display 64 may present the content of computing device 4 to a user. For example, display 64 may present a graphical user interface, a web browser, or other functions that may need to be presented to a user. In some examples, display 64 may be a touch screen that may allow a user to interact with the computing device 4.

User interface 66 allows a user of computing device 4 to interact with computing device 4. Examples of user interface 66 include, but are not limited to, a keypad embedded on computing device 4, a keyboard, a mouse, a roller ball, buttons, a touch screen, a graphical user interface, or other devices that allow a user to interact with computing device 4. In some examples, display 64 presents some or all of the functionality of user interface 66. For instance, display 64 may be a touch screen that presents a graphical user interface to allow a user to interact with computing device 4.

Communications unit 68 provides for communications with other data processing systems or devices. For example, communications unit 68 may be a network interface card. Communications unit 68 may provide communications through the use of either or both physical and wireless communications links.

Query processing module 6 receives a table join query to select information from one or more tables of a database. Query processing module 6 determines whether one or more pre-joined tables of the database is usable to service the received table join query. For example, in response to receiving the query, query processing module 6 generates query object 16. Query object 16 includes data and/or functions to manipulate the data in query object 16. Examples of such data include strings, integers, pointers, and the like. For instance, the data may include one or more predicate members to store or reference information about join predicates referenced in the query. In addition, query object 16 may include one or more table members to store or reference information about tables reference in the query. Similarly, query processing module 6 generates pre-joined table object 22. Pre-joined table object 22 includes one or more table members, predicate members, and the like, to store or reference information about a query used to join a pre-joined table.

Query processing module 6 generates table mapping structure 12 and predicate mapping structure 14. In some examples, query processing module 6 generates a query table index structure (e.g., query table index structure 44), a pre-join table index structure (e.g., pre-join table index structure 46), a pre-join predicate index structure (e.g., pre-join predicate index structure 52), and a query predicate index structure (e.g., query predicate index structure 54), and uses such structures to generate table mapping structure 12 and predicate mapping structure 14. Query processing module 6 uses table mapping structure 12 and predicate mapping structure 14 to determine whether a received table join query may be serviced by a pre-joined table. For example, query processing module 6 uses table mapping structure 12 to identify one or more table identifiers that are common to a group of table identifiers included in the received query and a group of table identifiers included in a query used to generate a pre-joined table. Query processing module 6 uses predicate mapping structure 14 to determine whether the join predicates associated with the received table join query and the query used to generate the pre-joined table match. For example, the semantics of an outer join command place a dependency on the join sequence of the tables. As such, query processing module 6 uses predicate mapping structure 14 to determine whether the join sequence of the tables in the query used to generate the pre joined tables matches the join sequence of the tables in the received query, such that the pre-joined table is usable to service the received query.

When query processing module 6 determines that the pre-joined table is usable to service the received table join query, query processing module 6 rewrites the received table join query to utilize the pre-joined table. For example, query processing module 6 may substitute the table names of table identifiers in the received query with the table names of matching table identifiers used to generate the pre joined table. Query processing module 6 submits such a rewritten query to query engine 10, which submits the rewritten portion of the query to accelerated query engine 8. Accelerated query engine 8 executes the rewritten query using the pre joined table, and returns a result of the executed query to query engine 10 for any remaining query processing (e.g., as executed by query engine 10 against one or more base tables of database 28). In some examples, when query processing module 6 determines that the received query is not serviceable by the pre-joined table, query processing module 6 submits the query to query engine 10. Query engine 10 executes the query, such as by submitting the query to a database against the base tables referenced in the query.

In certain examples, query processing module 6 determines that portions of the received query are serviceable by a pre-joined table, and other portions of the received query are not serviceable by the pre-joined table. In such examples, query processing module 6 rewrites the received query, such as by generating one or more table expressions to wrap the portion of the query that is serviceable by the pre joined table inside the table expression that is serviceable by query engine 10, as described in FIG. 1.

Figure 4A:
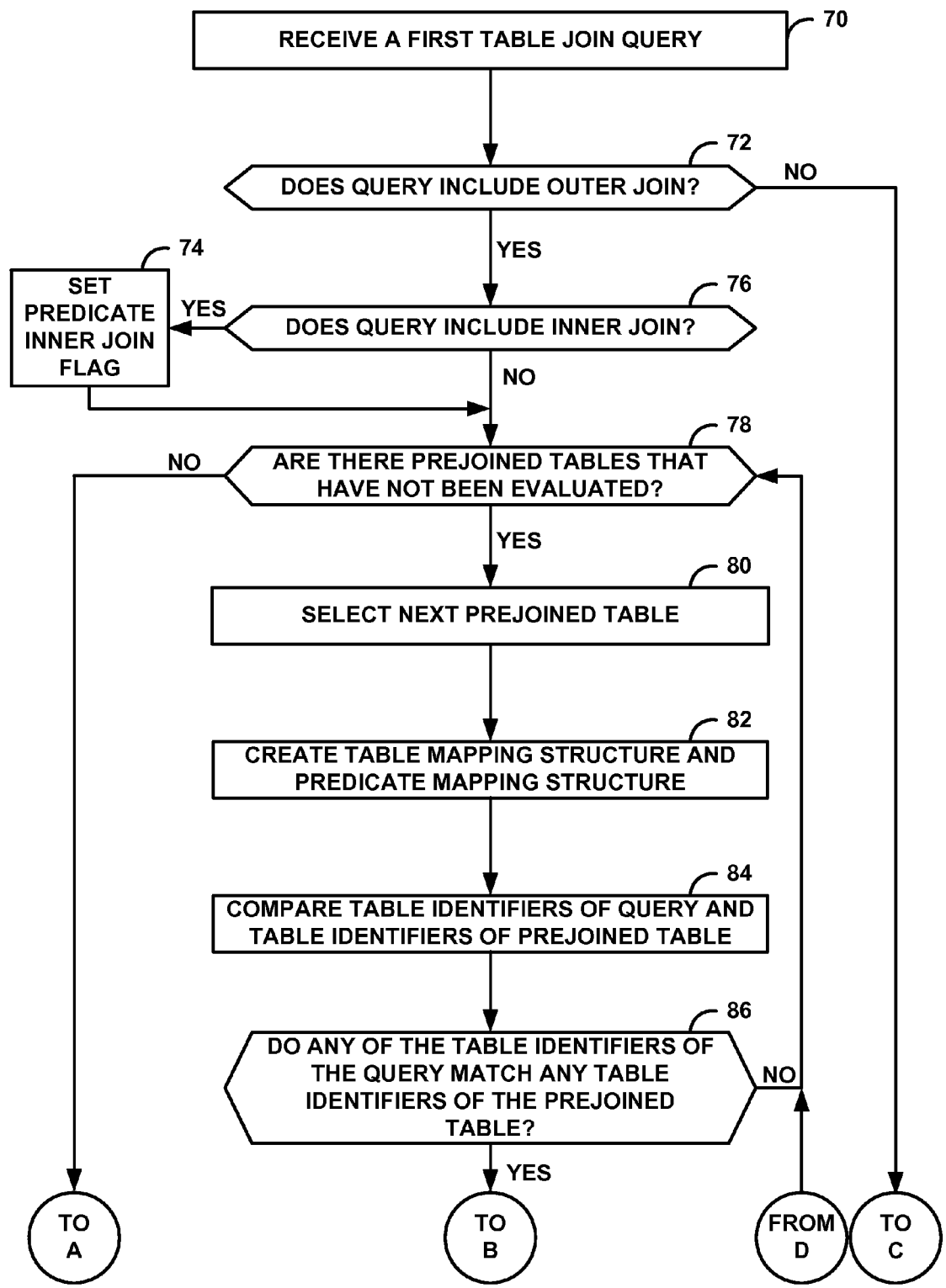
FIG. 4, consisting of FIGS. 4A and 4B, is a flow diagram illustrating an example operation of a computing device that may be used for rewriting a table join query to utilize a pre-joined table of a database, in accordance with one or more aspects of this disclosure.
Figure 4B:
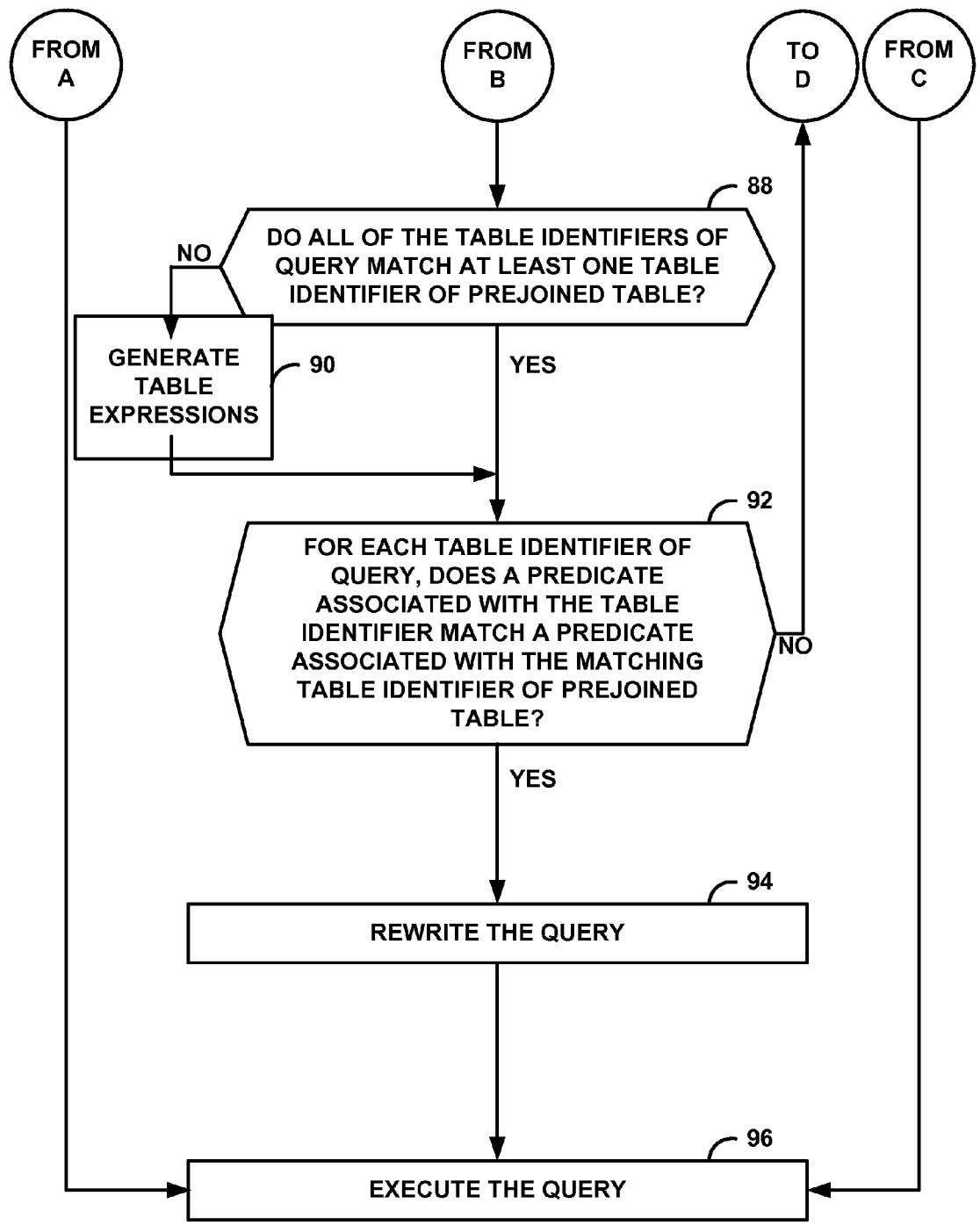

FIG. 4, consisting of FIGS. 4A and 4B, is a flow diagram illustrating an example operation of a computing device 4 for rewriting a table join query to utilize a pre-joined table of a database, in accordance with one or more aspects of this disclosure. Computing device 4 may receive a first table join query to select information from two or more tables of a database (70). For example, computing device 4 may receive an SQL query that includes a group of table identifiers that identify two or more tables. Query processing module 6, executing on one or more processors 60 of computing device 4, may determine whether the first table join query includes an outer join command (72). For example, the first table join query may include one or more table join commands, such as one or more of inner join commands, one or more outer join commands (e.g., a left outer join command), and the like. Query processing module 6 may parse the first table join query and determine whether the first table join query includes at least one outer join command. When the first table join query does not include an outer join command ("NO" branch of 72), query processing module 6 may submit the first table join query to query engine 10 to execute the query.

When the first table join query includes an outer join command ("YES" branch of 72), query processing module 6 may determine whether the query first table join query includes an inner join command (76). For instance, query processing module 6 may parse the first table join query to determine whether the first table join query includes an inner join command. When the first table join query includes an inner join command ("YES" branch of 76), query processing module 6 may set a predicate inner join flag indicating that the first table join query includes an inner join command (74). As an example, in response to receiving the first table join query, query processing module 6 generates query object 16 to store or reference information about the first table join query. Query object 16 includes data and/or functions to manipulate the data in query object 16. Query object 16 includes members, such as predicate member 18 and table member 20. Table member 20 includes information about tables referenced by the first table join query, such as the one or more table identifiers included in the first table join query. Predicate member 18 includes information about join predicates included in the first table join query. For instance, predicate member 18 stores or references one or more ON clauses of the first table join query. In addition, predicate member 18 includes information, such as a predicate inner join flag, to indicate that the join predicate is associated with an inner join command. Query processing module 6 uses the predicate inner join flag when matching join predicates of the first table join query and a query used to generate a pre-joined table. When the predicate inner join flag is set, query processing module 6 treats the predicate as a WHERE predicate. In certain examples, query processing module 6 includes an IS NOT NULL column in predicate mapping structure 14, which may be used to append an IS NOT NULL predicate when rewriting the first table join query.

When the first table join query does not include an inner join command ("NO" branch of 76), query processing module 6 may determine whether there are pre-joined tables of database 28 that have not been evaluated for use in servicing the first table join query (78). For example, there may be more than one pre joined table of database 28 (e.g., two, three, four, five, or more). Query processing module 6 selects a pre-joined table, and determines whether the pre-joined table is usable to service the first table join query. When query processing module 6 determines that the pre-joined table is not usable to service the first table join query, query processing module 6 selects a next pre-joined table for evaluation. Query processing module 6 continues to select pre joined tables for evaluation until a pre-joined table is found that is usable to satisfy the query. If query processing module 6 determines that there are no pre-joined tables usable to service the first table join query ("NO" branch of 78), query processing module 6 may submit the first table join query to query engine 10 to execute the query (e.g., as against two or more base tables rather than a pre-joined table).

When there are one or more pre-joined tables that have not been evaluated for use in servicing the first table join query ("YES" branch of 78), query processing module 6 may select a next pre-joined table (80). Query processing module 6 may create table mapping structure 12 and predicate mapping structure 14 associated with the first table join query and the query used to generate the selected pre-joined table (80). For example, as discussed above with respect to query object 16, query processing module 6 creates pre joined table object 22. Query processing module 6 uses query object 16 and pre-joined table object 22 to generate table mapping structure 12 and predicate mapping structure 14. In some examples, query processing module 6 creates one or more structures, such as a query table index structure, a pre-join table index structure, a pre-join predicate index structure, and a query predicate index structure. Query processing module 6 may use such structures to generate table mapping structure 12 and predicate mapping structure 14. Table mapping structure 12 includes information such as one or more query table indices, one or more pre-join table indices, and one or more table mapping flags. Predicate mapping structure 14 includes information such as one or more pre-join predicate indices, one or more query predicate indices, one or more predicate mapping flags, and one or more IS NOT NULL predicate table identifiers.

Query processing module 6 may compare table identifiers of the first table join query and table identifiers of the pre-joined table (84). For example, query processing module 6 uses table mapping structure 12 to compare the table identifiers of the group of table identifiers included in the first table join query and the table identifiers of the group of table identifiers included in the query used to generate the pre-joined table. Query processing module 6 determines whether any of the table identifiers of the first table join query match any table identifiers of the pre-joined table. For example, query processing module 6 selects one or more table members of a query object associated with the first table join query and one or more table members of a pre-joined table object associated with the selected pre-joined table to compare the groups of table identifiers. Query processing module 6 determines whether there are any common table identifiers included in the groups of table identifiers. A common table identifier may be a table identifier that is included in both the group of table identifiers of the first table join query and the group of table identifiers of the query used to generate the pre-join table. When none of the table identifiers in the group of table identifiers included in the first table join query match any table identifier in the group of table identifiers included in the query used to generate the pre-joined table ("NO" branch of 86), query processing module 6 may determine that the pre-joined table is not usable to service the first table join query, and may determine whether there are any pre-joined tables that have not been evaluated for use in servicing the first table join query.

When at least one of the table identifiers in the group of table identifiers included in the first table join query matches at least one table identifier in the group of identifiers included in the query used to generate the pre-joined table ("YES" branch of 86), query processing module 6 may determine whether all of the table identifiers in the group of table identifiers included in the first table join query match at least one table identifier in the group of identifiers included in the query used to generate the pre joined table (88). For example, table mapping structure 12 may include one or more table mapping flags associated with the query table identifiers and the pre-joined table identifiers. A table mapping flag may indicate that a table identifier is common to both groups of table identifiers. A common table identifier may be a table identifier that is included in both the group of query table identifiers and the group of pre joined table identifiers. In certain examples, a table mapping flag may indicate that a table identifier is an extra table identifier. An extra table identifier may be a table identifier that is included in the group of pre-joined table identifiers, but not included in the group of query table identifiers. In some examples, a table mapping flag may indicate that a table identifier is a residual table identifier. A residual table identifier may be a table identifier that is included in the group of query table identifiers, but not included in the group of pre-joined table identifiers.

Query processing module 6 may determine that all of the table identifiers of the first table join query match at least one table identifier of the pre-joined table. In such examples, all of the table identifiers of the first table join query are associated with a table mapping flag that indicates the table identifier is a common table identifier. When some, but not all, of the table identifiers of the first table join query match at least one table identifier of the pre-joined table ("NO" branch of 88), query processing module 6 may generate one or more table expressions to wrap the portion of the query that is serviceable by the pre-joined table inside the table expression that is serviceable by query engine 10.

When all of the table identifiers of the first table join query match at least one table identifier of the pre-joined table ("YES" branch of 88), query processing module 6 may determine for each table identifier of the first table join query whether a predicate associated with the table identifier matches a predicate associated with the matching table identifier of the pre joined table (92). For example, query processing module 16 may select a pair of common table identifiers. Query processing module 16 may select a query object (e.g., query object 16) and a pre-joined table object (e.g., pre-joined table object 22) associated with the common table identifiers.

The query object and pre-joined table object may each include one or more predicate members (e.g., predicate members 18 and 24) and one or more table members (e.g., table members 20 and 26). The table members store or reference information about tables included in the respective queries. The predicate members store or reference predicates associated with the table identifiers included in the queries. In addition, the table members may include one or more attributes (e.g., attributes 21 and 27). In some examples, one or more of attribute 21 or attribute 27 may be a pointer (e.g., named ON_PTR) that stores a memory address of a predicate member, such as predicate 18 or predicate member 24 respectively. Query processing module 6 may, in certain examples, compare the attributes (e.g. the ON_PTR attributes) to determine whether the predicates associated with the common table identifiers match.

In some examples, one or more of the first table join query or the query used to generate the pre joined table may include multiple instances of a table identifier. For instance, the first table join query may include two or more instances of a table identifier. However, each of the instances may be associated with a different predicate. Similarly, a pre-joined table may be joined using a query that includes two or more instances of a table identifier, each of which is associated with a different predicate. When two or more instances of the same table identifier are included in either or both of the first table join query or the query used to generate the pre joined table, query processing module 6 may determine that a pre-joined table is usable to service the first table join query even though the predicates associated with matching table identifiers do not match. For instance, query processing module 6 may determine that two or more predicates associated with common table identifiers are common to both the first table join query and the pre-joined table (e.g., identifying that a predicate mapping flag corresponding to the two or more predicates in predicate mapping structure 14 has a value of COMMON). In addition, query processing module 6 may determine that the common predicates are associated with common table identifiers. As such, query processing module 6 may determine that the predicates are interchangeable, such that the pre-joined table is usable to service the first table join query when the predicates associated with the common tables are swapped. In such an example, query processing module 6 may determine that the interchangeable predicates and table identifiers may enable the first table join query to be serviced using the pre-joined table. As such, query processing module 6 enables one or more of the first table join query or the query used to generate the pre-joined table to include multiple instances of the same table identifier. Moreover, query processing module 6 enables those multiple instances to occur in any order.

In some examples, when all of the table identifiers of the first table join query match at least one table identifier of the pre-joined table, query processing module 6 may determine whether each of the table identifiers of the query used to generate the pre-joined table matches at least one of the table identifiers of the first table join query. In other words, query processing module 6 determines whether there are any extra table identifiers included in the query used to generate the pre-joined table. In certain examples, query processing module 6 may determine that extra table identifiers are included in the query used to generate the pre-joined table. In such examples, query processing module 6 determines, for each of the extra table identifiers, whether the predicate associated with the extra table identifier resulted in a loss-less join. That is, query processing module 6 determines whether the join predicate associated with the extra table resulted in the removal of information from the pre-joined table (e.g., a lossy join). In examples including extra tables that result in a lossy join, query processing module 6 determines that the pre-joined table is not usable to service the first table join query.

Query processing module 6 may determine, for each table identifier in the query, that the predicate associated with the table identifier matches a predicate of the pre-joined table corresponding to the table identifier (92). When a predicate associated with the table identifier does not match a predicate associated with the matching table identifier of the pre-joined table ("NO" branch of 92), query processing module 6 may determine whether there are any remaining pre joined tables that have not been evaluated for use in servicing the first table join query. When for each table identifier of the first table join query, a predicate associated with the table identifier does match a predicate associated with the matching table identifier of the pre-joined table ("YES" branch of 92), query processing module 6 may rewrite the first table join query (94). For example, query processing module 6 may substitute the table names of table identifiers of the pre-joined table for the table names of the matching table identifiers of the first table join query. In some examples, when a predicate inner join flag associated with a predicate of the first table join command is set, query processing module 6 treats the predicate as a WHERE predicate, and appends an IS NOT NULL predicate when rewriting the first table join query.

Query processing module 6 may submit the rewritten query to query engine 10, which may submit the rewritten query (or a rewritten portion of the query) to accelerated query engine 8 to execute the rewritten query (96). Accelerated query engine 8 returns a result of the query executed using one or more pre-joined tables as input to query engine 10 for a remainder of query processing (e.g., using one or more base tables of database 28). In some examples, as when query processing module 6 determines that no pre-joined table exists that is usable to service the first table join query, query processing module 6 submits the rewritten query to query processing module 10 to execute the query (e.g., as against the base tables referenced in the first table join query rather than a pre-joined table).

Figure 5:
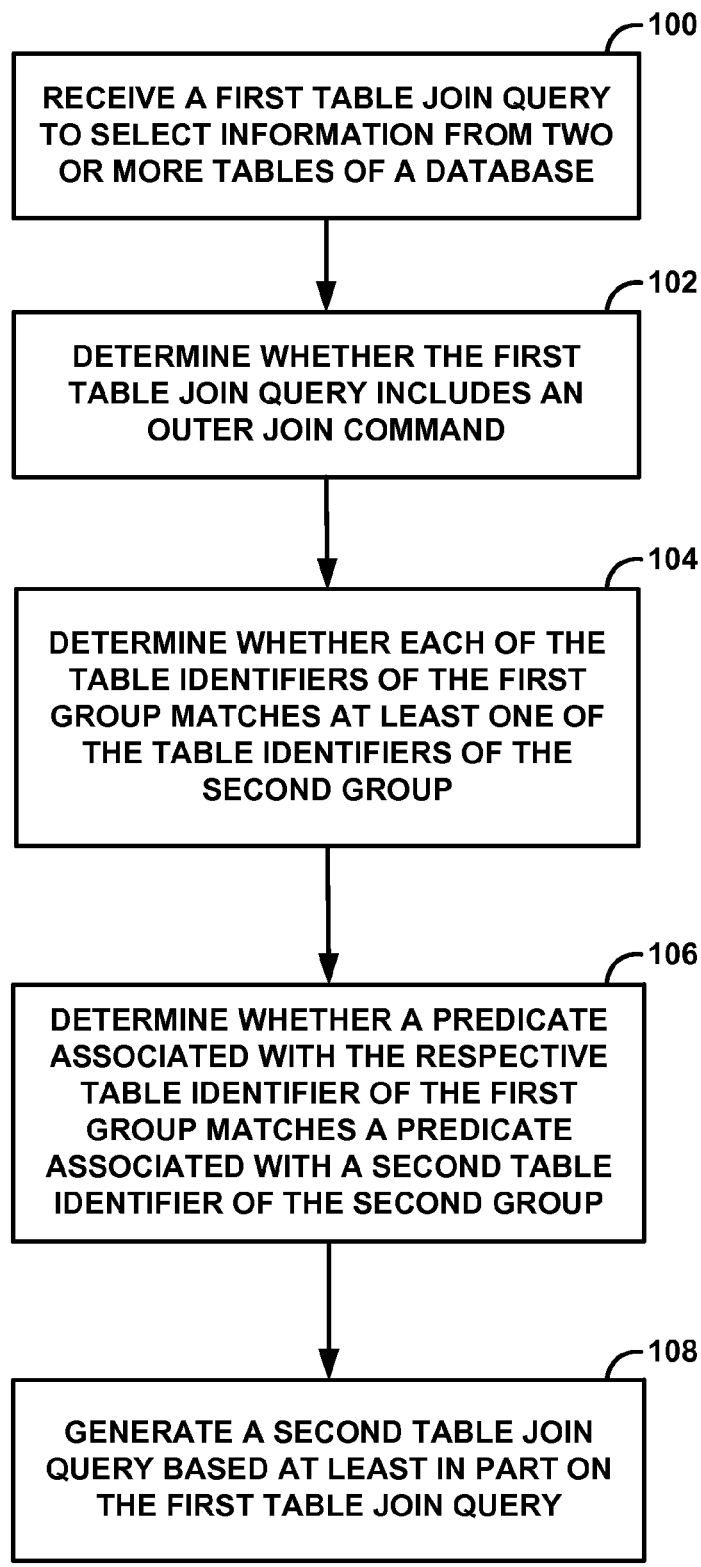
FIG. 5 is a flow diagram illustrating an example operation of a computing device that may be used for rewriting a table join query to utilize a pre-joined table of a database, in accordance with one or more aspects of this disclosure.

FIG. 5 is a flow diagram illustrating an example operation of a computing device that may be used for rewriting a table join query to utilize a pre-joined table of a database, in accordance with one or more aspects of this disclosure. Query processing module 6, executing on one or more processors 60 of computing device 4 may receive a first table join query to select information from two or more tables of a database (100). For example, query processing module 6 may receive an SQL query that includes a group of table identifiers that identify two or more tables of database 28. The first table join query may include one or more table join commands, such as one or more inner join commands, one or more outer join commands (e.g., a left outer join command), and the like.

Query processing module 6 may determine whether the first table join query includes an outer join command (102). For example, query processing module 6 may parse the first table join query to determine whether the first table join query includes an outer join command. Query processing module 6 may compare the first group of table identifiers of the first table join query and a second group of table identifiers of one or more pre-joined tables to determine whether each of the table identifiers of the first group matches at least one of the table identifiers of the second group (104). For instance, query processing module 6 may create table mapping structure 12. Table mapping structure 12 includes one or more table identifiers included in the first table join query and one or more table identifiers included in the query used to generate the pre-joined table. In addition, table mapping structure 12 includes one or more table mapping flags.

A table mapping flag may indicate that a table identifier is common to both groups of table identifiers (e.g., included in the group of table identifiers of the first table join query and included in the group of table identifiers of the query used to generate the pre-joined table). In some examples, a table mapping flag may indicate that a table identifier is an extra table identifier (e.g., included in the group of table identifiers of the query used to generate the pre-joined table, but not included in the group of table identifiers of the first table join query). In certain examples, a table mapping flag may indicate that a table identifier is a residual table identifier (e.g., included in the group of table identifiers of the first table join query, but not included in the group of table identifiers of the query used to generate the pre-joined table). Query processing module 6 may determine that each of the table identifiers of the first table join query matches at least one of the second group of table identifiers used to generate the pre joined table when each of the table identifiers of the first table join query is associated with a table mapping flag that indicates the table identifier is a common table.

When each of the table identifiers of the first group matches at least one of the table identifiers of the second group, query processing module 6 may determine for each table identifier of the first group whether a predicate associated with the respective table identifier of the first group matches a predicate associated with a second table identifier of the second group, wherein the second table identifier matches the first table identifier (106). For example, query processing module 6 may use predicate mapping structure 14 to determine whether a predicate index of each common table identifier of the first table join query matches a predicate index associated with the matching table identifier of the pre joined table.

When each of the predicates match, query processing module 6 may generate a second table join query based at least in part on the first table join query, wherein eh second table join query specifies at least one of the one or more pre-joined tables (108). For instance, query processing module 6 may generate a table join query based on the first table join query, but may substitute the table names of table identifiers in the first table join query with the table names of matching table identifiers used to generate the pre joined table.

In some examples, when fewer than all of the first group of table identifiers match at least one of the second group of table identifiers, query processing module 6 may determine, for each table identifier of the first group of table identifiers that matches a table identifier of the second group of table identifiers, whether the predicate associated with the respective table identifier of the first group matches the predicate associated with the second table identifier of the second group, wherein the second table identifier matches the first table identifier. In such an example, generating the second table join query may include generating one or more table expressions that include a table identifier associated with each of the at least one of the second group of table identifiers that match the at least one of the first group of table identifiers.

In certain examples, when each of the first group of table identifiers matches at least one of the second group of table identifiers, query processing module 6 may determine whether each of the second group of table identifiers matches at least one of the first group of table identifiers. When each of the second group of table identifiers does not match at least one of the first group of table identifiers, query processing module 6 may determine, for each table identifier of second group that does not match at least one of the first group of table identifiers, that a predicate associated with each of the table identifier results in a loss-less join.

In some examples, comparing the first group of table identifiers and the second group of table identifiers of the one or more pre-joined tables may further include determining, for each table identifier of the first group of table identifiers whether a table mapping flag of a table mapping structure 12 indicates that the table identifier matches at least one of the second group of table identifiers.

In certain examples, determining, for each table identifier of the first group of table identifiers whether the predicate associated with the table identifier matches the predicate associated with the second table identifier of the second group may further include determining, for each table identifier of the first group of table identifiers whether a predicate mapping flag of a predicate mapping structure 14 indicates that the predicate associated with the table identifier matches the predicate associated with the second table identifier of the second group.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Various aspects of the disclosure have been described. These and other aspects are within the scope of the following claims.

The invention claimed is:

1. A method comprising:
 receiving, by a computing device, a first table join query to select information from two or more tables of a database, wherein the first table join query comprises a first group of table identifiers that identify the two or more tables;
 determining, by the computing device, whether the first table join query includes an outer join command;
 when the first table join query includes the outer join command:

comparing, by the computing device, the first group of table identifiers and a second group of table identifiers that identify one or more pre-joined tables to determine whether each of the table identifiers of the first group matches at least one of the table identifiers of the second group;

when each of the table identifiers of the first group matches at least one of the table identifiers of the second group, determining, by the computing device and for each table identifier of the first group, whether a predicate associated with the respective table identifier matches a predicate associated with a second table identifier of the second group, wherein the second table identifier matches the respective table identifier;

responsive to determining that the predicate associated with the respective table identifier does not match a respectively ordered predicate associated with a second table identifier, determining whether at least two instances of the respective table identifier are included in a first order in the first table join query;

responsive to determining that the at least two instances of the respective table identifier are included in the first order in the first table join query, determining by the computing device, that at least two predicates associated with the at least two instances of the respective table identifier are common to predicates associated with one or more instances of the second table identifier that are included in a second, different ordering of a query used to generate the one or more pre-joined tables;

determining, by the computing device, that the at least two predicates are interchangeable such that the one or more pre-joined tables are usable to service the first table join query when the first order of the at least two predicates are swapped to the second order; and generating, by the computing device and based on the determination that the at least two predicates are interchangeable when the first order of the at least two predicates are swapped to the second order, a second table join query based at least in part on the first table join query, wherein the second table join query specifies at least one of the one or more pre-joined tables.

2. The method of claim 1, further comprising:
when fewer than all of the first group of table identifiers match at least one of the second group of table identifiers, determining, by the computing device, for each table identifier of the first group of table identifiers that matches a table identifier of the second group of table identifiers, whether the predicate associated with the respective table identifier of the first group matches the predicate associated with the second table identifier of the second group, wherein the second table identifier matches the first table identifier,
wherein generating the second table join query comprises generating one or more table expressions that include a table identifier associated with each of the at least one of the second group of table identifiers that match the at least one of the first group of table identifiers.

3. The method of claim 1, further comprising:
when each of the first group of table identifiers matches at least one of the second group of table identifiers, determining, by the computing device, whether each of the second group of table identifiers matches at least one of the first group of table identifiers; and when each of the second group of table identifiers does not match at least one of the first group of table identifiers, determining, by the computing device, and for each table identifier of the second group that does not match at least one of the first group of table identifiers, that a predicate associated with each of the table identifiers results in a loss-less join.

4. The method of claim 1, wherein comparing the first group of table identifiers and the second group of table identifiers of the one or more pre-joined tables further comprises determining, for each table identifier of the first group of table identifiers whether a table mapping flag of a table mapping structure of the computing device indicates that the table identifier matches at least one of the second group of table identifiers.

5. The method of claim 1, wherein determining, for each table identifier of the first group of table identifiers whether the predicate associated with the table identifier matches the predicate associated with the second table identifier of the second group further comprises determining, for each table identifier of the first group of table identifiers whether a predicate mapping flag of a predicate mapping structure of the computing device indicates that the predicate associated with the table identifier matches the predicate associated with the second table identifier of the second group.

6. The method of claim 1, wherein generating the second table join query further comprises substituting a table name associated with a table identifier included in the first table join query with a table name associated with a table identifier included in the second group of table identifiers that identify the one or more pre-joined tables.

7. A computer program product comprising a non-transitory computer-readable storage medium having computer-readable program code embodied therein, the computer-readable program code comprising:

computer-readable program code to receive a first table join query to select information from two or more tables of a database, wherein the first table join query comprises a first group of table identifiers that identify the two or more tables;

computer-readable program code to determine whether the first table join query includes an outer join command;

computer-readable program code to compare the first group of table identifiers and a second group of table identifiers of one or more pre-joined tables to determine whether each of the first table identifiers of the first group matches at least one of the table identifiers of the second group, when the first table join query includes the outer join command;

computer-readable program code to determine for each table identifier of the first group whether a predicate associated with the respective table identifier matches a predicate associated with a second table identifier of the second group when each of the table identifiers of the first group matches at least one of the table identifiers of the second table group, wherein the second table identifier matches the respective table identifier;

computer-readable program code to, responsive to determining that the predicate associated with the respective table identifier does not match a respectively ordered predicate associated with a second table identifier, determine whether at least two instances of the respective table identifier are included in a first order in the first table join query;

computer-readable program code to, responsive to determining that the at least two instances of the respective table identifier are included in the first order in the first table join query, determine that at least two predicates associated with the at least two instances of the respective table identifier are common to predicates associated with one or more instances of the second table identifier that are included in a second, different ordering of a query used to generate the one or more pre-joined tables;

computer-readable program code to, determine that the at least two predicates are interchangeable such that the one or more pre-joined tables are usable to service the first table join query when the first order of the at least two predicates are swapped to the second order; and computer-readable program code to generate, and based on the determination that the at least two predicates are interchangeable when the first order of the at least two predicates are swapped to the second order, a second table join query based at least in part on the first table join query, wherein the second table join query specifies at least one of the one or more pre-joined tables.

8. The computer program product of claim 7, the computer-readable program code further comprising:

computer-readable program code to determine for each table identifier of the first group of table identifiers that matches a table identifier of the second group of table identifiers, whether the predicate associated with the respective table identifier of the first group matches the predicate associated with the second table identifier of the second group, when fewer than all of the first group of table identifiers match at least one of the second group of table identifiers, wherein the second table identifier matches the first table identifier, wherein generating the second table join query comprises generating one or more table expressions that include a table identifier associated with each of the at least one of the second group of table identifiers that match the at least one of the first group of table identifiers.

9. The computer program product of claim 7, the computer-readable program code further comprising:

computer-readable program code to determine whether each of the second table identifiers matches at least one of the first table identifiers, when each of the first table identifiers matches at least one of the second table identifiers; and computer-readable program code to determine for each of the second table identifiers that does not match at least one of the first table identifiers that a predicate associated with each of the table identifier results in a loss-less join, when each of the second table identifiers does not match at least one of the first table identifiers.

10. The computer program product of claim 7, wherein the computer-readable program code to compare the first group of table identifiers and the second group of table identifiers of the one or more pre-joined tables further comprise computer-readable program code to determine, for each table identifier of the first group of table identifiers whether a table mapping flag of a table mapping structure of the computer program product indicates that the table identifier matches at least one of the second group of table identifiers.

11. The computer program product of claim 7, wherein the computer-readable program code to determine, for each table identifier of the first group of table identifiers whether the predicate associated with the table identifier matches the predicate associated with the second table identifier of the second group further comprises, computer-readable program code to determine, for each table identifier of the first group of table identifiers whether a predicate mapping flag of a predicate mapping structure of the computer program product indicates that the predicate associated with the table identifier matches the predicate associated with the second table identifier of the second group.

12. The computer program product of claim 7, wherein the computer-readable program code to generate the second table join query further comprises computer-readable program code to substitute a table name associated with a table identifier included in the first table join query with a table name associated with a table identifier included in the second group of table identifiers that identify the one or more pre-joined tables.

13. A computing device, comprising:

one or more processors; and a query processing module executable by the one or more processors to:

receive a first table join query to select information from two or more tables of a database, wherein the first table join query comprises a first group of table identifiers that identify the two or more tables;

determine whether the first table join query includes an outer join command;

when the first table join query includes the outer join command:

compare the first group of table identifiers and a second group of table identifiers of one or more pre-joined tables to determine whether each of the first table identifiers of the first group matches at least one of the table identifiers of the second group;

determine for each table identifier of the first group whether a predicate associated with the respective table identifier matches a predicate associated with a second table identifier of the second group when each of the first table identifiers of the first group matches at least one of the second table identifiers of the second group, wherein the second table identifier matches the respective table identifier;

responsive to determining that the predicate associated with the respective table identifier does not match a respectively ordered predicate associated with a second table identifier, determine whether at least two instances of the respective table identifier are included in a first order in the first table join query;

responsive to determining that the at least two instances of the respective table identifier are included in the first order in the first table join query, determine that at least two predicates associated with the at least two instances of the respective table identifier are common to predicates associated with one or more instances of the second table identifier that are included in a second, different ordering of a query used to generate the one or more pre-joined tables;

determining, by the computing device, that the at least two predicates are interchangeable such that the one or more pre-joined table re usable to service the first table join query when the first order of the at least two predicates are swapped to the second order; and generate, and based on the determination that the at least two predicates are interchangeable when the first order of the at least two predicates are swapped to the second order, a second table join query based at least in part on the first table join query, wherein the second table join query specifies at least one of the one or more pre-joined tables.

14. The computing device of claim 13, wherein the query processing module is further executable by the one or more processors to:
  determine for each table identifier of the first group of table identifiers that matches a table identifier of the second group of table identifiers, whether the predicate associated with the respective table identifier of the first group matches the predicate associated with the second table identifier of the second group, when fewer than all of the first group of table identifiers match at least one of the second group of table identifiers, wherein the second table identifier matches the first table identifier,
  wherein generating the second table join query comprises generating one or more table expressions that include a table identifier associated with each of the at least one of the second group of table identifiers that match the at least one of the first group of table identifiers.

15. The computing device of claim 13, wherein the query processing module is further executable by the one or more processors to:
  determine whether each of the second table identifiers matches at least one of the first table identifiers, when each of the first table identifiers matches at least one of the second table identifiers; and
  determine for each of the second table identifiers that does not match at least one of the first table identifiers, that a predicate associated with each of the table identifier results in a loss-less join, when each of the second table identifiers does not match at least one of the first table identifiers.

16. The computing device of claim 13, wherein comparing the first group of table identifiers and the second group of table identifiers of the one or more pre-joined tables further comprises determining, for each table identifier of the first group of table identifiers whether a table mapping flag of a table mapping structure of the computing device indicates that the table identifier matches at least one of the second group of table identifiers.

17. The computing device of claim 13, wherein the query processing module is further executable by the one or more processors to determine, for each table identifier of the first group of table identifiers whether a predicate mapping flag of a predicate mapping structure of the computing device indicates that the predicate associated with the table identifier matches the predicate associated with the second table identifier of the second group.

* * * * *